Patented June 5, 1928.

1,672,585

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO, A CORPORATION OF OHIO.

PROCESS OF AND MATERIAL FOR TREATING SEWAGE AND INDUSTRIAL WASTE.

No Drawing. Application filed May 23, 1927. Serial No. 193,729.

This invention relates to an improved process of and materal for treating domestic sewage and industrial waste.

The invention has for its primary object, the employment as a reagent in a process for treating sewage and waste, invented by me, of a waste material resulting from the manufacture of chloride of lime, chlorine, and caustic soda, in what is generally known as an "alkali plant."

The waste material from an alkali plant which I employ, and which will be hereinafter designated "solid waste" is obtained in the following manner:—

The numerous waste solutions from an alkali plant are normally conveyed to ponds or reservoirs, where the mixing and concentration of the various waste solutions results in the formation of a number of chemical compounds insoluble in this liquid, due to the chemical action of the various constituents present in these waste solutions. These insoluble chemical compounds coagulate in the mixture in the pond and settle out. The liquid of the solutions is then drawn off and the mixture of precipitates recovered. These recovered precipitates represent the solid waste of the alkali plant and constitute the material with which may present invention specifically deals. To prepare the solid waste for use, in my process for treating sewage and industrial waste, the same is mechanically dried and pulverized. This solid waste is characterized by the fact that it contains ionizable salts, calcium, iron and aluminum equivalent to about 20% by weight of the material. It also contains calcium hydroxide equal to about 11.7% by weight of the material, which latter content is important in my process, as will be hereinafter apparent. The solid waste also contains a small amount of soluble salts of iron which are available as a coagulant in my process. It will be appreciated that the analysis ofthe solid waste will vary slightly depending upon whether the output of the alkali plant is chlorine, chloride of lime, or caustic soda, since the waste solutions delivered to the pond will not be entirely uniform in the production of all these products. It can be said, however, that the general characteristics of the solid waste from an alkali plant remain substantially constant.

An analysis of a typical solid waste from an alkali plant is as follows:—

| | Per cent. |
|---|---|
| Silica | 1.90 |
| Ferric oxide | 2.24 |
| Ferric sulphate | .78 |
| Aluminum oxide | .13 |
| Aluminum sulphate | .08 |
| Potassium chloride | .06 |
| Sodium chloride | 1.37 |
| Calcium chloride | 1.83 |
| Calcium sulphate | 1.34 |
| Calcium carbonate | 74.80 |
| Calcium hydroxide | 11.71 |
| Magnesium carbonate | 4.10 |

To the end that this invention may be more readily understood, I have outlined my general process for the treatment of domestic sewage and industrial waste.

My process is, in a large degree, predicated upon the discovery that the bacteria and putrescible matter present in sewage and industrial waste are principally colloids and that the colloidal matter contained in the sewage or waste is the all important part thereof. The biochemical oxygen demand of sewage or waste has been proved to be due largely to the colloids. The colloidal matter content of the secretions and excretions of the human body is very high. About 80% of fæcal matter vigorously shaken with water is colloidal and about 85% of the entire oxygen demand of the solution is due to the colloidal fraction.

Colloids are characterized by their inability to diffuse through dialyzing membranes and may be isolated by this means. Since the bacteria and putrescible matter in sewage are colloids, it is evident that any process for treating sewage which does not cope efficiently with the colloidal matter, cannot efficiently perform the function of sewage purification.

Heretofore the treatment of sewage has been founded largely on the idea that the bacteria will consume the organic matter in the sewage. Bacterial cells are rich in protein. The multiplication of bacteria in sewage is essentially the changing of one protein into another, namely, the changing of the proteins in sewage to bacterial proteins. I find that the putrescible matter is not consumed by the bacteria but that there is merely formed another putrescible protein which in many instances, is just as putrescible as the original proteins. My process, therefore, contemplates the precipitation and removal of these colloids from the sewage and industrial waste treated. I have further discovered that colloids are not isolated ions or molecules but aggregates of molecules or ions and molecules, and lie between the point of suspension and the point of solution. They are neither in suspension or solution but are in dispersion. As the colloids migrate in an electrical field under the influence of an electrical current, they necessarily must be charged. Generally it may be said that they are positively charged in an acid solution and negatively charged in an alkaline solution. The sign of the colloid may be changed by the addition of an acid or an alkaline solution. In fresh sewage, the colloids are usually negative as the sewage has an alkaline reaction. As sewage becomes septic it will, under ordinary conditions, become acid and the sign of the colloids will be positive.

I find that the colloids may be precipitated from an alkaline solution, the sign of the colloids being negative, by the addition of an electrolyte supplying an excess of positive ions. For this reason, an alkali such as hydrated lime is added to the sewage or waste undergoing treatment in slight excess so as to produce an alkaline condition in the material, the sign of a positive colloid being thereby changed to negative while the sign of any negative colloid will remain negative.

Once an alkaline condition has been produced in the sewage or industrial waste, it will be understood that all the colloids are negatively charged. To effect a precipitation of the colloids it is necessary to change them from a condition of dispersion to one of suspension. This is accomplished by neutralizing the charge of the colloids and destroying their stability in the sewage or industrial waste. The neutralizing of the charge of the colloids is effected by introducing an electrolyte which dissociates, forming positive and negative ions. The negative colloids unite with the positive ions of the electrolyte, thereby neutralizing the charge of the colloids. The colloids having thus been changed from a condition of dispersion to one of suspension and their stability destroyed, may be readily carried down by a suitable coagulant such as iron sulphate or aluminum sulphate.

Concurrently with the uniting of the positive ions of the electrolyte with the negative colloids, there is a release of negative ions from the electrolyte which act on the water solution, effecting a release of nascent oxygen, which materially assists in the destruction of bacteria and produces an effluent containing a very substantial quantity of dissolved oxygen. No reaeration of the effluent will be found necessary.

Now in the above process it will be observed that the sewage is transformed from an acid to an alkaline condition; all the positive colloids are thus changed into negative colloids while the positive ions of the electrolyte are adsorbed by the negatively charged colloids, neutralizing their charge and destroying their stability, the suspended matter is coagulated and carried down, the negative ions of the electrolyte acting on the water solution releasing nascent oxygen, thus giving a purified, clear effluent having a high content of dissolved oxygen.

The solid waste described earlier in this specification, when employed in my process produces a powerful electrolyte. Furthermore, due to its content of calcium hydroxide, it very materially assists in the transformation of the sewage from an acid condition to an alkaline condition, thus materially lessening the quantity of hydrated lime necessary. The iron salts present in the solid waste are available to assist the coagulant and, therefore, enable the employment of a less quantity of the coagulating agent.

It is apparent that the use of the solid waste from an alkali plant in my process is a most advantageous one. This solid waste which has accumulated in vast deposits represents a total loss and constant expense to manufacturers of products of alkali plants. It, however, possesses characteristics that render it peculiarly applicable for use in my process and makes the practice of my process both economical and efficient.

A specific illustration of the treatment of a typical domestic sewage by my process employing solid waste herein described is given below. The sewage treated showed upon analysis:

| | | |
|---|---|---|
| Total solids | 720 | P. P. M. |
| Total organic matter | 280 | P. P. M. |
| Suspended matter | 260 | P. P. M. |
| Suspended organic matter | 210 | P. P. M. |
| Organic nitrogen | 12.8 | P. P. M. |
| Albuminoid nitrogen | 4.6 | P. P. M. |
| Dissolved oxygen | .2 | P. P. M. |
| 10 day biochemical oxygen demand | 210. | |
| Total bacteria | 2,650,000 | per c. c. |
| B. coli | 310,000 | per c. c. |

In the treatment of this sewage, I employed solid waste from an alkali plant, calcium sulphate, hydrated lime, and ferrous sulphate in the following proportions:—

Pounds per 1000 gallons sewage treated.

| | |
|---|---|
| Solid waste | 4.2 |
| Calcium sulphate | 1.5 |
| Hydrated lime | 1.3 |
| Ferrous sulphate | .5 |

The sewage was mildly agitated to uniformly distribute the reagents through the liquid. Precipitated or coagulated solids were permitted to settle. Upon analysis the effluent was found to show the following:

| | | |
|---|---|---|
| Total solids | 340 | P. P. M. |
| Total organic matter | 55 | P. P. M. |
| Suspended matter | 10 | P. P. M. |
| Organic suspended matter | 5 | P. P. M. |
| Organic nitrogen | 3.4 | P. P. M. |
| Albuminoid nitrogen | .9 | P. P. M. |
| Dissolved oxygen | 4.8 | P. P. M. |
| 10 day biochemical oxygen demand | 15 | |
| Total bacteria | 1250 | per c. c. |
| B coli | 12 | per c. c. |

It is to be understood that the terms "waste material" and "waste product" as employed in the claims have reference to the solid waste of an alkali plant recovered from the waste solutions discharged from such plant in the manufacture of chlorine, chloride of lime and caustic soda and contemplate a substance containing ionizable salts of calcium, iron, and aluminum at least equivalent to substantially 20% by weight of the material containing a substantial quantity of calcium hydroxide, a representative analysis of which substance has been hereinbefore given.

From the foregoing description it will be apparent that I have not only provided an efficient process for treating domestic sewage and industrial waste but that I have also provided for the economical disposal of vast quantities of the solid waste material from alkali plants as well as provided a novel mixture incorporating such solid waste for use in the treating of sewage.

While in the specific example above given I have indicated that the four ingredients, solid waste, calcium sulphate, hydrated lime, and ferrous sulphate were employed, I desire to be understood that this is merely exemplary and that in the treatment of some sewage excellent results may be obtained by using the solid waste alone or by using the solid waste in combination with any one of or all of the materials.

It will be noted also that the specific proportions given merely relate to the mixture used in the illustrative treatment above set forth. The solid waste should, however, always constitute the predominating constituent of the treating mixture. The quantity of lime used will obviously vary somewhat depending upon the acidity of the liquid under treatment. The total quantity of the treatment mixture best adapted for treatment of any given polluted liquid may be readily ascertained by one skilled in the art by making a few trial tests and noting the rapidity of precipitation, the size of the floc, and the clarification of the liquid. The total quantity of treating mixture above given, namely, 7½ pounds per 1000 gallons of liquid treated, is illustrative and this quantity may be varied to meet the particular requirements of any given liquid. Any worker versed in the art of liquid purification can readily ascertain the quantity of the mixture which gives the best results.

Having described my invention, what I claim is:—

1. A method for treating sewage and polluted industrial waste including the step of introducing to the sewage or polluted waste a quantity of solid waste material which has been precipitated from the waste solutions discharged during the manufacture of chlorine, chloride of lime, and caustic soda.

2. A step in a process for treating sewage and polluted industrial waste comprising introducing to the sewage or polluted waste a quantity of pulverized solid material recovered from the waste solutions discharged from an alkali plant during the manufacture of chlorine, chloride of lime, and caustic soda.

3. A process for treating sewage and industrial waste comprising changing the sewage from an acid to an alkaline condition and introducing to the sewage or waste a quantity of solid material recovered from the waste solutions discharged from an alkali plant and a suitable coagulant.

4. A method for treating sewage and industrial waste including subjecting the sewage or waste to the action of lime and a pulverized solid material recovered from the waste solutions discharged from an alkali plant.

5. A method for treating sewage and industrial waste comprising introducing to the sewage or waste, lime, pulverized waste material recovered from the waste solutions discharged from an alkali plant and ferrous sulphate.

6. A method for treating sewage and industrial waste comprising introducing to the sewage or waste, lime, calcium sulphate, pulverized waste material recovered from the waste solutions discharged from an alkali plant, and a coagulant.

7. A material for use in treating sewage and industrial waste comprising pulverized solid material recovered from the waste solutions discharged from an alkali plant during the manufacture of chlorine, chloride of lime, and caustic soda.

8. A mixture for treating sewage and industrial waste including lime, pulverized material recovered from the waste solutions discharged from an alkali plant and ferrous sulphate.

9. A mixture for treating sewage and industrial waste including lime, pulverized material recovered from the waste solutions discharged from an alkali plant and ferrous sulphate, the quantity of said pulverized material being in excess of the quantity of any other material in the mixture.

10. A process for treating polluted liquids comprising introducing to the polluted liquid a waste product from the manufacture of chlorine, said waste product being characterized by its ability to transform colloids present in the liquid into suspensoids and coagulating the resulting suspensoids.

11. A process for treating polluted liquids containing putrescible matter in colloidal form comprising introducing to the liquid a reagent containing waste products of an alkali plant characterized by their ability to transform the colloids present in the liquid into suspensoids and effect a substantial coagulation of the resulting suspensoids.

12. A process for treating polluted liquids containing putrescible matter in colloidal form comprising reacting on said liquids with a reagent adapted to effect an alkaline reaction in the liquid, transform colloids in the liquid into suspensoids, and coagulate the resulting suspensoids, said reagent including a waste product from an alkali plant containing materials adapted to assist in each of said reactions.

JOHN T. TRAVERS.